A. J. H. KUHSIEK AND A. MAYER.
PISTON RING.
APPLICATION FILED JUNE 11, 1920.
1,419,150. Patented June 13, 1922.
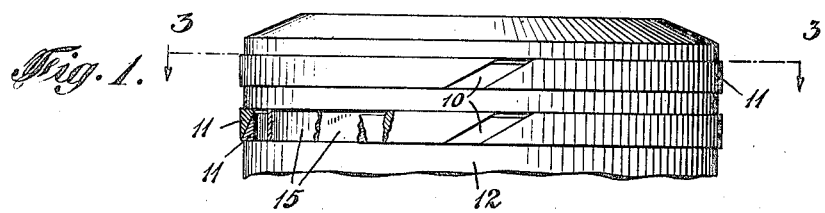
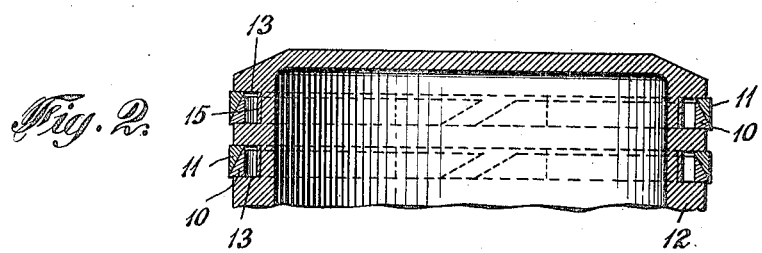
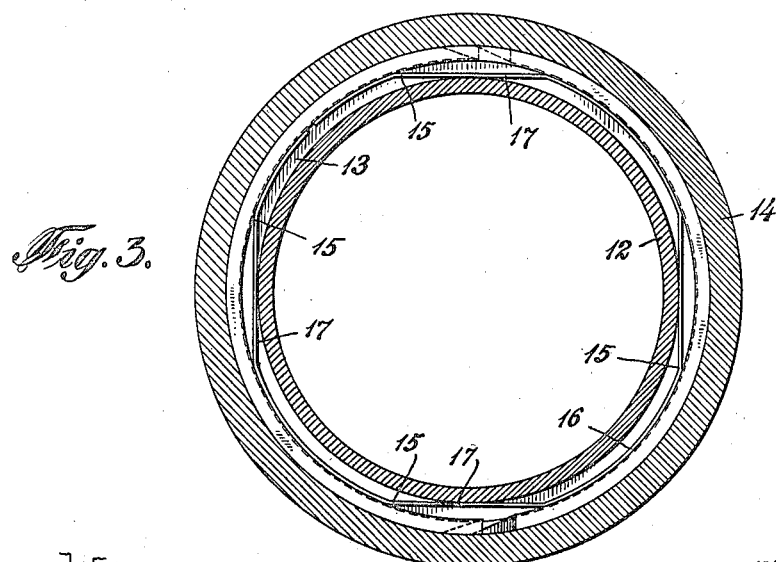
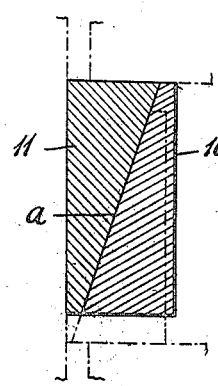
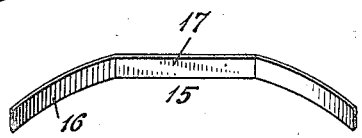
Inventors
Albert J. H. Kuhsiek
Arthur Mayer
By their Attorneys

UNITED STATES PATENT OFFICE.

ALBERT J. H. KUHSIEK AND ARTHUR MAYER, OF BROOKLYN, NEW YORK, ASSIGNORS TO STEEL SPRING PISTON RING CO., OF BROOKLYN, NEW YORK, A CORPORATION OF NEW YORK.

PISTON RING.

1,419,150.  Specification of Letters Patent.  Patented June 13, 1922.

Application filed June 11, 1920. Serial No. 388,085.

*To all whom it may concern:*

Be it known that we, ALBERT J. H. KUHSIEK and ARTHUR MAYER, both citizens of the United States, and residents of the borough of Brooklyn, county of Kings, city and State of New York, have invented certain new and useful Improvements in Piston Rings, of which the following is a specification.

Our invention relates to piston rings and more particularly to metallic piston rings of the type which are sprung into annular grooves in the piston and has for its object to provide an improved and simplified construction whereby the efficiency of the piston ring as a packing is increased to a maximum extent. Other more specific objects of our invention will appear from the description hereinafter and the features of novelty will be pointed out in the appended claims.

In the accompanying drawings which show an example of our invention, without defining its limits, Fig. 1 is a fragmentary elevation of a piston provided with our improved piston ring; Fig. 2 is a longitudinal section thereof; Fig. 3 is a cross-section on the line 3—3 of Fig. 1; Fig. 4 is a cross-section of the ring itself on an enlarged scale and Fig. 5 is a perspective view of a portion of a spring included in our invention.

In its illustrated form our improved piston ring comprises an inner annular member 10 and an outer annular member 11 fitted one within the other, both members being split and located with respect to each other so that the split of one is out of registry with the split of the other member. The contiguous surfaces *a* of the annular members which engage each other are inclined relatively to the common axis thereof, the illustrated example showing the inner surface of the outer member converging upwardly and the outer surface of the inner member diverging downwardly; in other words both annular members are of substantially triangular form in cross-section and are combined with the apices of the triangles pointing in opposite directions, so that the complete ring is of substantially rectangular form in cross-section as shown in Fig. 4.

When combined with the piston 12, which may be of any well known type, each complete ring lies in an annular groove 13 and engages the inner surface of the cylinder 14 in the customary manner. In order to maintain each ring in close and even engagement with the cylinder 14, we provide a spring 15 which lies within the groove 13 between said ring and the inner wall of said groove; this spring 15 is of special formation and is formed with curved portions 16 which lie against the inner surface of the inner ring member 10 and are concentric therewith and which are connected by straight portions 17. The latter are located in engagement with the inner wall of the piston groove 13 and extend tangentially thereto; with this arrangement the spring comprises a series of alternate curved and straight sections which alternately engage the ring and the inner wall of the piston groove 13. The spring 15 is split and exerts an outward tension, uniform throughout and whereby the outer ring member 11 is forced into close engagement with the inner wall of the cylinder; the outward pressure of said spring 15 exerted upon the ring also causes the inclined contiguous surfaces *a* of the members 10 and 11 to function as cams and to shift the ring members 10 and 11 relatively to each other in the direction of their common axis. This relative shifting of the ring members causes them to engage the opposite transverse walls of the groove 13 so that said ring completely fills the latter. The combined action of the springs 15 and the inclined contiguous surfaces of the members 10 and 11 thus forces the ring to automatically assume a position, at all times, in which it constitutes a packing of maximum efficiency.

In practice the spring 15 will be made of sufficiently high tension to serve as a cushion whereby piston slap due to a worn cylinder or piston, is prevented and whereby a perfect running fit between the ring and the inner wall of the cylinder is at all times insured. The form of the spring 15 is of particular importance in that it provides a plurality of active curved sections connected together by a plurality of relatively straight sections which, by extending tangentially to the inner wall of the groove 13 and engaging the same only at limited points of contact provide the necessary reaction without interfering with the resiliency of the spring as a whole. That is to say, when in use, the spring exerts a resilient tension at all points between the tangential points of contact of the strainght portions 17 with the inner wall of said groove 13.

Our improved piston ring is simple in construction and economical to manufacture and is of uniform and maximum efficiency as a packing; the ring may readily be combined with the piston and detached therefrom.

Various changes in the specific form shown and described may be made within the scope of the claims without departing from the spirit of our invention.

The present application is a continuation in part, of another application filed by us, as joint inventors on December 9, 1918, Serial No. 265,844.

We claim:

1. The combination of a cylinder, a piston therein having an annular groove formed in its outer surface, a piston ring comprising an outer annular member and an inner annular member fitted within the same, the contacting surfaces of said members being inclined relatively to the common axis thereof and a spring bearing against the inner ring member and against the inner wall of the groove whereby said contacting surfaces are caused to function as cams to shift said ring members relatively to each other in the direction of their common axis into engagement with the transverse walls of said groove and to facilitate the radial expansion of said ring, said spring extending continuously throughout said groove and comprising alternately curved portions engaging and concentric with the inner ring member and continuing straight portions connecting the curved portions extending tangent to and engaging the inner wall of said groove.

2. A spring for piston rings comprising a split member arranged to encircle a piston and consisting of alternate curved portions and straight portions connecting the same, said curved portions, in use, being concentric to said piston and said straight portions being tangent thereto.

In testimony whereof we hereunto set our hands.

ALBERT J. H. KUHSIEK.
ARTHUR MAYER.